(12) United States Patent
Curl et al.

(10) Patent No.: US 9,511,804 B2
(45) Date of Patent: Dec. 6, 2016

(54) AUTOMATIC ROLLING FIFTH WHEEL HITCH

(71) Applicant: Cequent Performance Products, Inc., Plymouth, MI (US)

(72) Inventors: Michael R. Curl, Osceola, IN (US); Newly Mach, South Bend, IN (US); Richard McCoy, Granger, IN (US); Eric Stanifer, Mishawaka, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 13/834,407

(22) Filed: Mar. 15, 2013

(65) Prior Publication Data

US 2014/0265244 A1   Sep. 18, 2014

(51) Int. Cl.
*B62D 53/08* (2006.01)

(52) U.S. Cl.
CPC ................. *B62D 53/0814* (2013.01)

(58) Field of Classification Search
CPC ..... B62D 53/08; B62D 53/06; B62D 53/0814; B62D 53/0835
USPC .................. 280/441.1, 438.1, 441
See application file for complete search history.

(56) References Cited

U.S. PATENT DOCUMENTS

| 599,245 | A | 2/1898 | Merrill |
|---|---|---|---|
| 725,662 | A | 4/1903 | Bohlen |
| 1,205,351 | A | 11/1916 | Johnson |
| 1,288,425 | A | 12/1918 | Keesler |
| 1,385,361 | A | 7/1921 | Clement |
| 1,408,530 | A | 3/1922 | Pierce |
| 1,606,379 | A | 11/1926 | Osterman |
| 1,752,638 | A | 1/1930 | Johnson |
| 1,995,920 | A | 3/1935 | Gurton et al. |
| 2,038,975 | A | 4/1936 | Willetts |
| 2,078,492 | A | 4/1937 | Gurton et al. |
| 2,351,151 | A | 6/1944 | Sattler |
| 2,444,944 | A | 7/1948 | Minter |
| 2,761,699 | A | 9/1956 | Martin |
| 2,807,477 | A | 9/1957 | Tuso, Jr. |
| 3,059,795 | A | 10/1962 | Schroeder |
| 3,345,081 | A | 10/1967 | Hartwig |
| 3,561,076 | A | 2/1971 | Gunther |
| 3,722,917 | A | 3/1973 | Mims |
| 3,729,214 | A | 4/1973 | Mulcahy et al. |

(Continued)

FOREIGN PATENT DOCUMENTS

| DE | 2529262 | 1/1977 |
|---|---|---|
| GB | 827185 | 2/1960 |
| SU | 880848 | 1/1977 |

*Primary Examiner* — Anne Marie Boehler
*Assistant Examiner* — Marlon A Arce
(74) *Attorney, Agent, or Firm* — McDonald Hopkins LLC

(57) ABSTRACT

A fifth wheel hitch is shown and described. The fifth wheel hitch may include a base frame configured to be secured to a load bed of a towing vehicle, a trolley operatively engaged with the base frame, the trolley adapted to move along the base frame between first and second positions, and a cam member attached with the base frame, the cam member having a cam path. The fifth wheel hitch may also include a cam follower coupled with the trolley, the cam follower operatively engaged with the cam path, and a fifth wheel head pivotally coupled with the trolley, where the trolley is moved between the first and second positions in response to pivoting of the fifth wheel head.

38 Claims, 12 Drawing Sheets

(56) References Cited

U.S. PATENT DOCUMENTS

| | | |
|---|---|---|
| 3,787,068 A | 1/1974 | Miller |
| 3,790,191 A | 2/1974 | Gallatin |
| 3,810,661 A | 5/1974 | Lowrance |
| 3,820,821 A | 6/1974 | Leland |
| 3,823,961 A | 7/1974 | Korodi |
| 3,826,516 A | 7/1974 | Weber |
| 3,834,736 A | 9/1974 | Dodgson |
| 3,850,449 A | 11/1974 | Link et al. |
| 3,861,716 A | 1/1975 | Baxter et al. |
| 3,893,710 A | 7/1975 | Madura |
| 3,917,314 A | 11/1975 | Neal |
| 3,955,831 A | 5/1976 | Whitchurch |
| 3,972,542 A | 8/1976 | Dirks et al. |
| 4,068,860 A | 1/1978 | Meyers et al. |
| 4,359,234 A | 11/1982 | Mittelstadt |
| 4,429,892 A | 2/1984 | Frampton et al. |
| 4,721,323 A | 1/1988 | Czuk et al. |
| 4,738,127 A | 4/1988 | Johnson |
| 4,744,581 A | 5/1988 | Cables |
| 4,955,631 A | 9/1990 | Meyer |
| 4,960,288 A | 10/1990 | Chambers |
| 4,997,218 A | 3/1991 | Culling |
| 5,044,651 A | 9/1991 | Weikel |
| 5,071,152 A | 12/1991 | Ducote |
| 5,135,248 A | 8/1992 | Keiserman |
| 5,449,191 A | 9/1995 | Cattau |
| 5,551,815 A | 9/1996 | Rainbow et al. |
| 5,566,963 A | 10/1996 | Johnson |
| 5,772,229 A | 6/1998 | Cattau |
| 5,839,745 A | 11/1998 | Cattau et al. |
| 5,890,728 A | 4/1999 | Zilm |
| 6,065,766 A | 5/2000 | Pulliam |
| 6,135,482 A | 10/2000 | Larkin |
| 6,161,402 A | 12/2000 | Moore |
| 6,247,720 B1 | 6/2001 | Linger et al. |
| 6,308,977 B1 * | 10/2001 | Pulliam et al. ............... 280/441 |
| 6,357,777 B1 | 3/2002 | Linger et al. |
| 6,386,570 B2 | 5/2002 | Linger et al. |
| 6,427,496 B1 | 8/2002 | Hurst |
| 6,467,791 B1 | 10/2002 | Fandrich et al. |
| 6,474,674 B2 | 11/2002 | Piercey, III |
| 6,485,045 B1 | 11/2002 | King |
| 6,488,305 B2 | 12/2002 | Laarman |
| 6,502,846 B2 | 1/2003 | Fandrich et al. |
| 6,554,310 B2 | 4/2003 | Babin |
| 6,557,883 B2 | 5/2003 | Linger et al. |
| 6,682,089 B2 | 1/2004 | McCoy et al. |
| 6,685,210 B2 | 2/2004 | Lindenman et al. |
| 6,736,420 B2 | 5/2004 | Laarman et al. |
| 6,837,511 B1 | 1/2005 | Johnson, III |
| 6,935,650 B2 | 8/2005 | Grinde et al. |
| 6,981,715 B1 | 1/2006 | Aylett |
| 7,198,282 B2 | 4/2007 | Burchett |
| 7,475,899 B2 | 1/2009 | Crawley |
| 7,490,846 B2 | 2/2009 | Kaun |
| 7,506,886 B2 | 3/2009 | Warnock |
| 7,543,837 B2 | 6/2009 | Crawley |
| 7,726,678 B1 * | 6/2010 | Connell et al. ............... 280/441 |
| 7,753,392 B2 | 7/2010 | Warnock |
| 8,220,818 B1 * | 7/2012 | Pulliam et al. ............... 280/441 |
| 2001/0020776 A1 | 9/2001 | Linger et al. |
| 2004/0145151 A1 * | 7/2004 | Grinde et al. ............. 280/438.1 |
| 2004/0173992 A1 | 9/2004 | Stunder et al. |
| 2005/0248124 A1 * | 11/2005 | Phillips et al. ............... 280/477 |
| 2007/0007747 A1 | 1/2007 | Laarman |
| 2007/0187925 A1 * | 8/2007 | Lindeman et al. ........ 280/438.1 |
| 2008/0029995 A1 | 2/2008 | Alguera |
| 2011/0210529 A1 * | 9/2011 | Markstaller ........ B62D 53/0814 280/438.1 |
| 2012/0018977 A1 | 1/2012 | Stanifer et al. |
| 2012/0018978 A1 | 1/2012 | McCoy et al. |
| 2012/0018979 A1 | 1/2012 | McCoy et al. |

* cited by examiner

AUTOMATIC ROLLING FIFTH WHEEL HITCH

FIELD OF INVENTION

The present invention relates generally to a fifth wheel hitch and, more particularly, to an automatically rolling fifth hitch for moving fifth wheel trailer in a predetermined manner in response to predefined movements.

BACKGROUND

The towing industry has developed a number of methods and apparatuses for securing a towed vehicle to a towing vehicle. One particularly prevalent towing apparatus is a fifth wheel hitch. The fifth wheel hitch is normally positioned in a load bed of a towing vehicle and secured either to the load bed or directly to the frame of the towing vehicle. A fifth wheel trailer typically includes a king pin that operatively couples the towed vehicle to the towing vehicle.

Fifth wheel hitches may normally be arranged such that the king pin is aligned over or near the rear axle and approximately equidistant between the rear wheels of the towing vehicle. Placing the king pin over the rear axle may also provide for sufficient clearance between the front edge of the trailer and the rear edge of the towing vehicle cabin when standard sized towing and towed vehicle are involved.

However, there are more towing vehicles on the market that include extended cabs having an expanded interior cargo volume. These extended cab towing vehicles, however, are typically built on a standard wheelbase chassis. This results in the load bed being shorter than standard towing vehicles. These shorter load beds result in the towing vehicles not having sufficient clearance between the axle and the rear of the cab to allow the towed vehicle to pivot appropriately.

Current prior art systems attempt to adapt fifth wheel trailers to short bed pickup trucks, but have shortcomings. For example, some systems use a hydraulically operated sliding base to force the hitch assembly rearward away from the towing vehicle cab. Such a system, however, is expensive and difficult to maintain. Further these systems often require operator intervention, which could make it generally ineffective.

Another prior art system uses a sliding base that requires the operator to exit the towing vehicle, unlock the base, lock the brakes on the towed vehicle and pull the towing vehicle forward. This temporarily moves the pivot point rearward so that the towed vehicle can pivot relative to the towing vehicle. However, before resuming normal operation, the operator must lock the towed vehicle brakes, back the towing vehicle towards the towed vehicle, again exit the towing vehicle and lock the sliding hitch. This is extremely inconvenient.

Still further, other prior art systems require sliding mechanisms on which the fifth wheel hitch engages to move the fifth wheel hitch rearward during certain conditions. These systems, however, may be subject to premature wear and constant maintenance. The sliding arrangement is often subject to accumulation of debris, which may negatively impact the overall function of the sliding arrangement. These sliding systems also utilize cam paths that are generally linear. These generally linear cam paths limit the distance the fifth wheel hitch may travel rearward during operation. Further still, these prior art systems may be limited in their stability, especially, from an operator's perspective.

Accordingly, there exists a need for an improved automatic fifth hitch assembly that allows towing vehicles with short load beds to effectively tow towed vehicles. Specifically, there is a need for an automatic fifth wheel hitch that is positionable to maintain the appropriate operative position of the towed vehicle relative to the towing vehicle that is robust, easy to maintain and does not require operator intervention. Further, there is a need for an automatic fifth wheel hitch assembly that is able to move rearward a greater distance to allow sufficient clearance between the towing vehicle cab and towed vehicle.

SUMMARY

A fifth wheel hitch is shown and described. The fifth wheel hitch may include a base frame configured to be secured to a load bed of a towing vehicle, a trolley operatively engaged with the base frame, the trolley adapted to move along the base frame between first and second positions, and a cam member attached with the base frame, the cam member having a cam path. The fifth wheel hitch may also include a cam follower coupled with the trolley, the cam follower operatively engaged with the cam path, and a fifth wheel head pivotally coupled with the trolley, where the trolley is moved between the first and second positions in response to pivoting of the fifth wheel head.

A fifth wheel hitch may include a base frame securable to a load bed of a towing vehicle, the base frame including a channel, a trolley having a plurality of rollers, the rollers operatively engaged with the channel, where the trolley is moveable between first and second positions with respect to the base frame, and a cam path, the cam path having a first portion. The fifth wheel hitch may also include a cam follower coupled with the trolley, the cam follower operatively engaging the first portion of the cam path, where pivoting of the cam follower releases the cam follower from the first portion permitting movement of the trolley fore and aft between the first and second positions.

A fifth wheel hitch may include a base frame securable to a load bed of a towing vehicle, the base frame including a channel, a trolley operatively engaged with the channel, where the trolley is positionable between first and second positions with respect to the base frame, and a fifth wheel head pivotally coupled to the trolley. The fifth wheel hitch may also include a cam path, the cam path having a first portion, and a cam follower coupled with the trolley and engaged with the cam path, where pivoting of the fifth wheel head moves the cam follower from the first portion causing the trolley to move between the first and second positions.

A fifth wheel hitch may include a base frame securable to a load bed of a towing vehicle, the base frame including a channel. The fifth wheel hitch may also include a fifth wheel head operatively coupled with the based frame, where the fifth wheel head is positionable fore and aft between first and second positions along the channel.

DESCRIPTION OF THE DRAWINGS

Operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
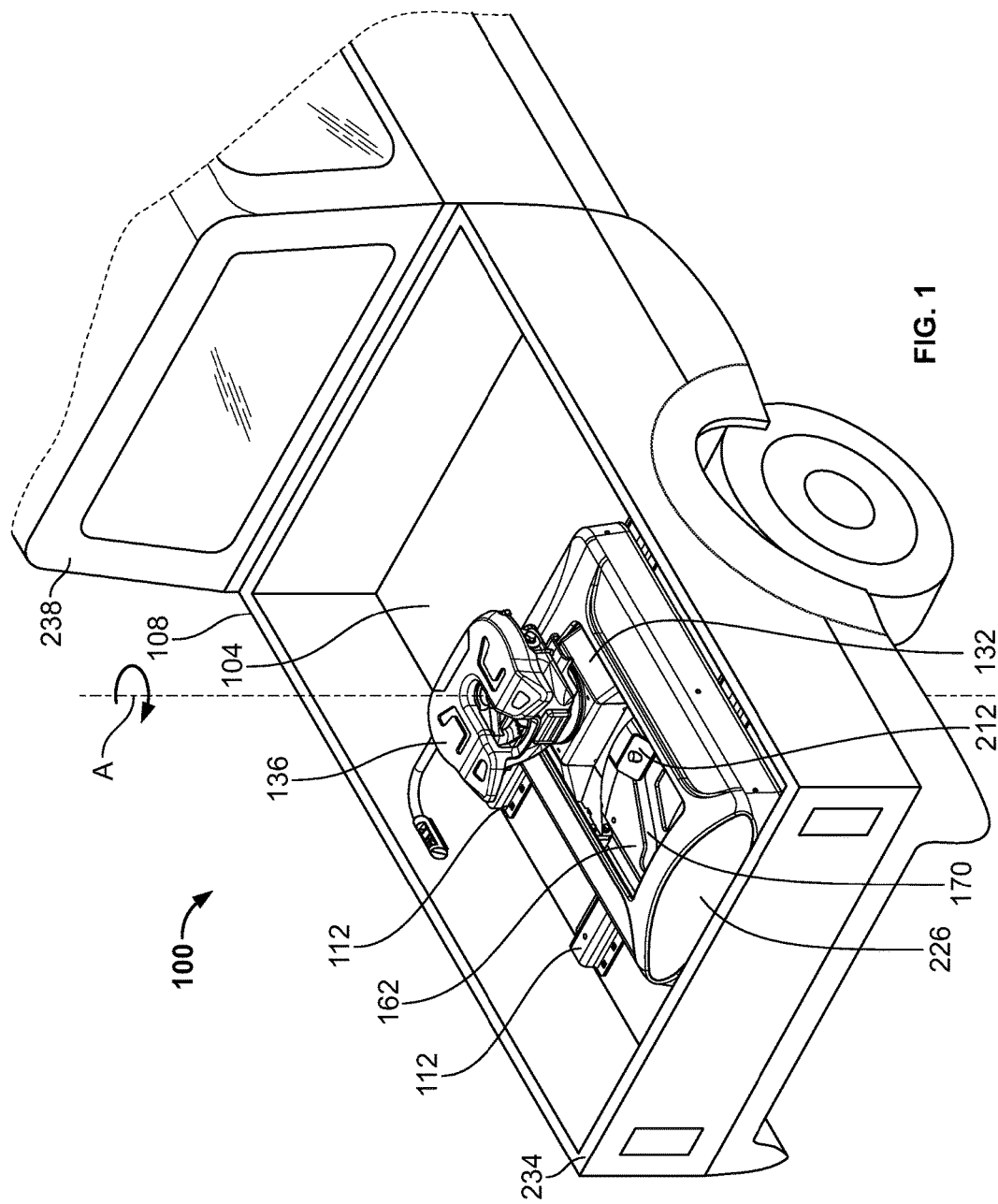
FIG. 1 is a perspective view of an automatic rolling fifth wheel hitch selectively secured with a load bed of a towing vehicle.
Figure 2:
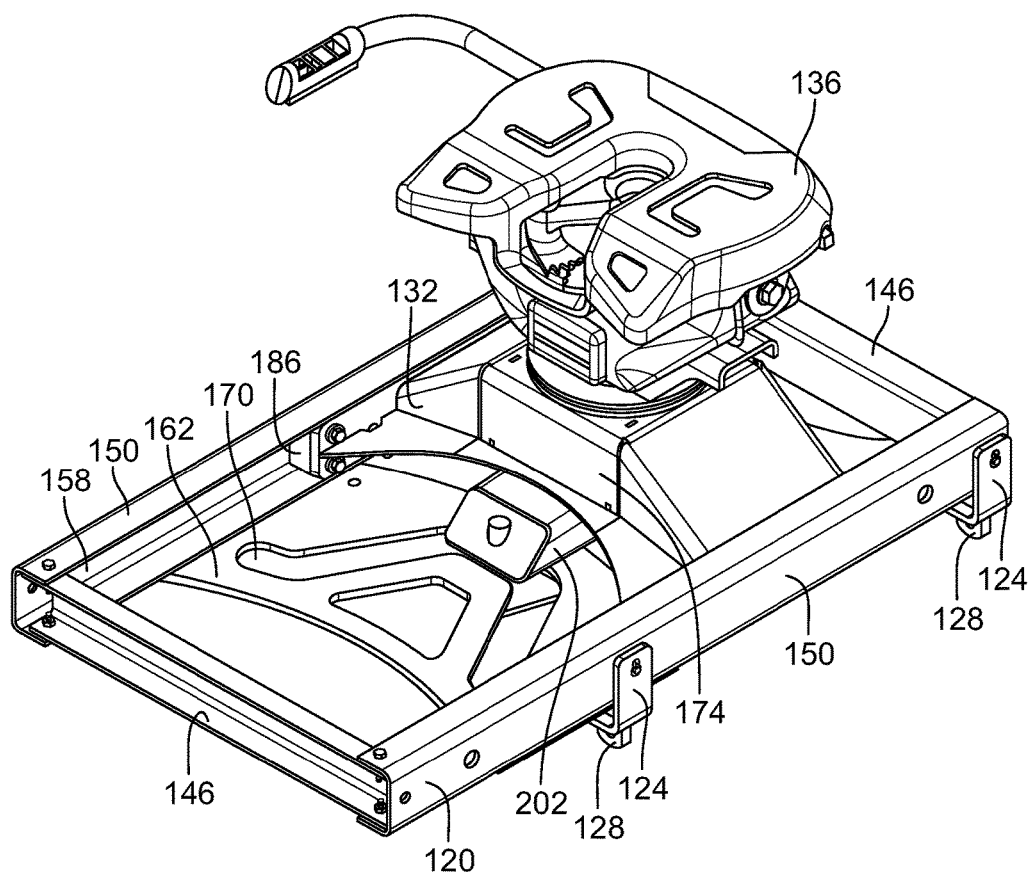
FIG. 2 is a perspective view of the automatic rolling fifth wheel hitch.
Figure 3:
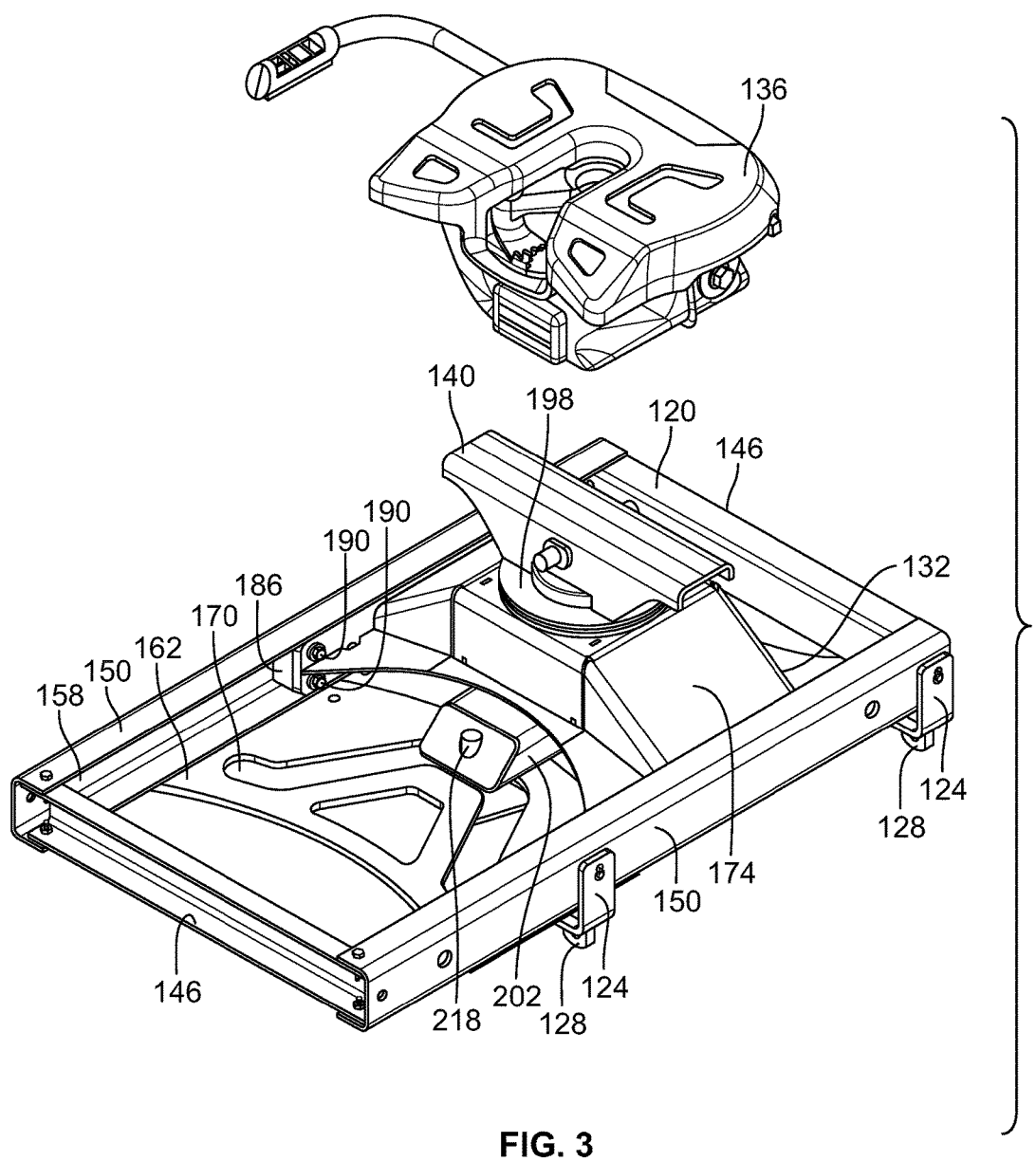
FIG. 3 is a partially exploded perspective view of the automatic rolling fifth wheel hitch.

An automatic rolling fifth wheel hitch 100 is shown in FIGS. 1-3. The automatic rolling fifth wheel hitch 100 may attach to a load bed 104 of a towing vehicle 108 in any appropriate manner. By way of a non-limiting example, a pair of rail members 112 may be selectively attached to the load bed 104 in any appropriate manner, including, without limitation utilizing fasteners, securement devices or the like. The rail members 112 may extend transversely across the load bed 104 as shown in FIG. 1. The rail members 112 may be configured to attach a standard fifth wheel hitch as well as the automatic rolling fifth wheel hitch 100 or may be specifically configured for the automatic rolling fifth wheel hitch 100. The automatic rolling fifth wheel hitch 100 may be selectively attached to the rail members 112 in any appropriate manner; such as by way of a non-limiting example via fasteners (not shown). Any appropriate configuration of fasteners may be used—the present teachings are not limited to a specific configuration of fasteners.

The automatic rolling fifth wheel hitch 100 may include a base frame 120 selectively secured to the rail members 112. The base frame 120 may include at least one bracket 124, including, without limitation two pairs of brackets 124 attached thereto. The brackets 124 may attach with the rail members 112 through the use of fasteners (not shown). Specifically, each of the brackets 124 may include a leg 128 attached thereto in any appropriate manner, including, without limitation being integrally formed therewith. The legs 128 may be insertable into the rail members 112. Fasteners may then be inserted into and through the legs 128 and rail members 112 selectively securing the automatic rolling fifth wheel hitch 100 with the rail members 112 and the load bed 104 of the towing vehicle 108. This arrangement may make it easy to remove the automatic rolling fifth wheel hitch 100 when not needed.

The automatic rolling fifth wheel hitch 100 may include a trolley 132 operatively engaged with the base frame 120 as described in more detail below. The automatic rolling fifth wheel hitch 100 may further include a fifth wheel head 136 pivotally attached with the trolley 132. The fifth wheel head 136 may be of any appropriate configuration such that a king pin of a towed vehicle may operatively engage with the fifth wheel head 136 resulting in the towing vehicle 108 being capable of towing the towed vehicle. By way of a non-limiting example, the fifth wheel head 136 may be of a configuration as shown and described in any one of: U.S. patent application Ser. No. 13/190,878 (Publication No. 20120018979) entitled "Fifth Wheel Hitch Isolation System," filed Jul. 26, 2011; U.S. patent application Ser. No. 13/190,919 (Publication No. 20120018978) entitled, "Fifth Wheel Hitch Retention System," filed Jul. 26, 2011; and U.S. patent application Ser. No. 13/191,009 (Publication No. 20120018977) entitled "Fifth Wheel Hitch Skid Plate Cover," filed Jul. 26, 2011, all of which are hereby incorporated by reference. Further, the fifth wheel head 136 may be of a configuration as shown and described in all of the applications incorporated by reference immediately above. However, the present teachings are not limited to these disclosed configurations of the fifth wheel head 136. Any appropriate configuration may be used.

As shown in FIG. 3, the fifth wheel head 136 may be pivotally attached with the trolley 132 through use of a pivot shaft 140. The fifth wheel head 136 may be attached with the pivot shaft 140 in any appropriate manner. By way of a non-limiting example, the fifth wheel head 136 may be attached with the pivot shaft 140 through the use of fasteners, welding, or the like. The fifth wheel head 136 attached with the pivot shaft 140 may result in the fifth wheel head 136 being pivotable with respect to the base frame 120. The pivoting of the fifth wheel head 136 may allow the towed vehicle to pivot with respect to the towing vehicle 108 during operation. Therefore, as the towing vehicle 108 turns, the fifth wheel head 136 may pivot independently of the towing vehicle 108. This may permit the towed vehicle to turn more efficiently and effectively.

Figure 6:
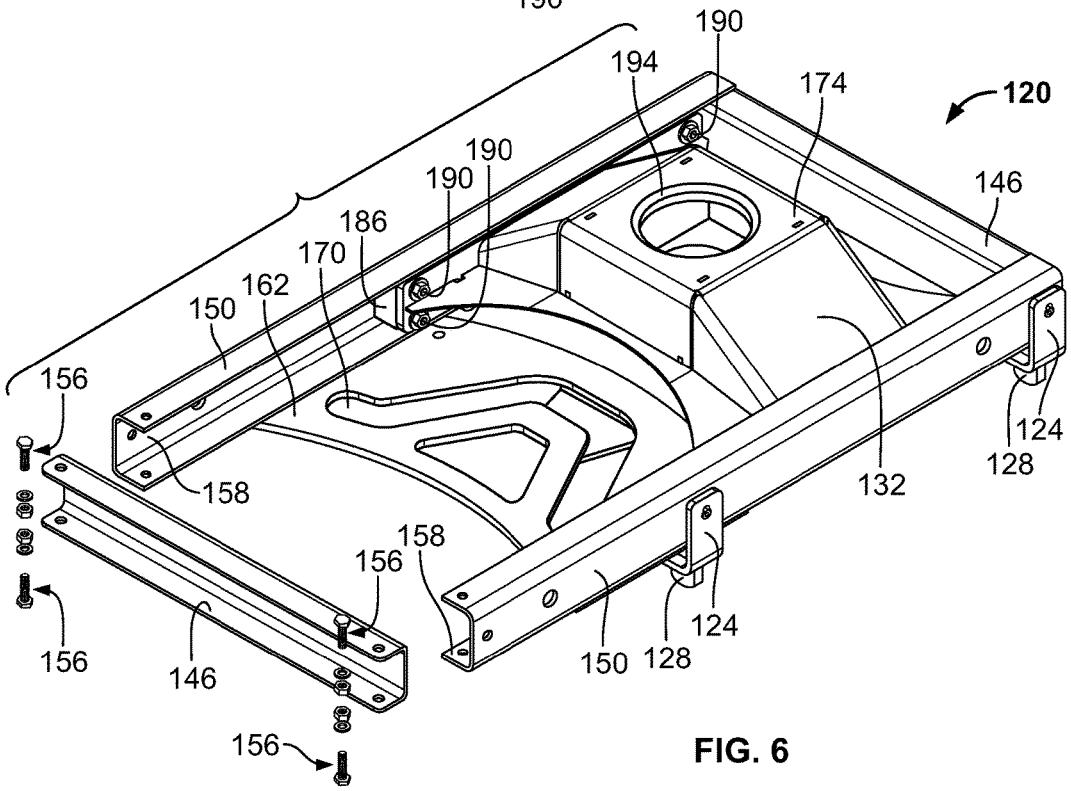
FIG. 6 is a perspective view of the base frame of the automatic rolling fifth wheel hitch.

As shown in FIG. 6, the base frame 120 may include a pair of end rails 146 and a pair of longitudinally extending rails 150. The rails 146, 150 may be operatively secured together to form the base frame 120. By way of a non-limiting example, fasteners 154 may be utilized to secure the rails 146, 150 together. The present teachings, however, are not limited to the use of fasteners 154. The rails 146, 150 may be attached such as through welding, being monolithically formed together, welded, or otherwise adhered together. The longitudinally extending rails 150 may each have a generally C-shaped cross sectional shape such that they each include a channel 158. The channel 158 may be of a shape and size to permit rolling engagement of the trolley 132 with the base frame 120.

The base frame 120 may further include a cam plate 162 attached to the base frame 120 in any appropriate manner.

By way of a non-limiting example, the cam plate 162 may be attached to an underside 166 of the longitudinal rails 150 such as through the use of fasteners, welding or the like. The cam plate 162 may include a cam path 170 formed therein. The cam path 170 may be formed as a monolithic unit with the cam plate 162 or may be formed therein through a subsequent operation.

Figure 8:
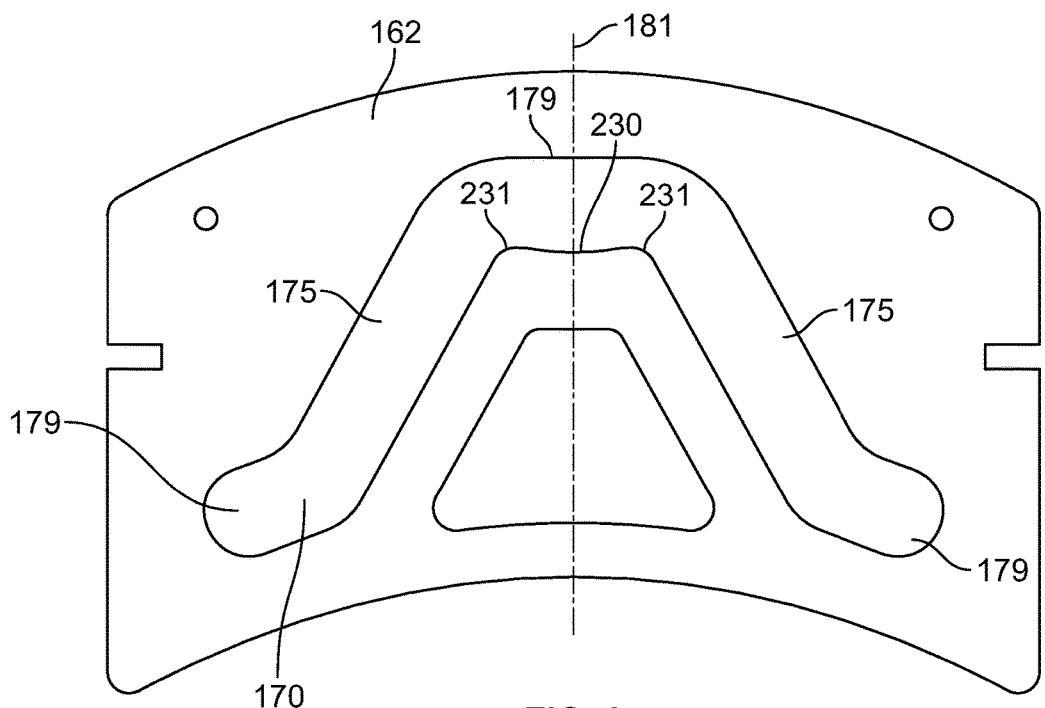
FIG. 8 is a top view of embodiments of a cam plate.
Figure 9:
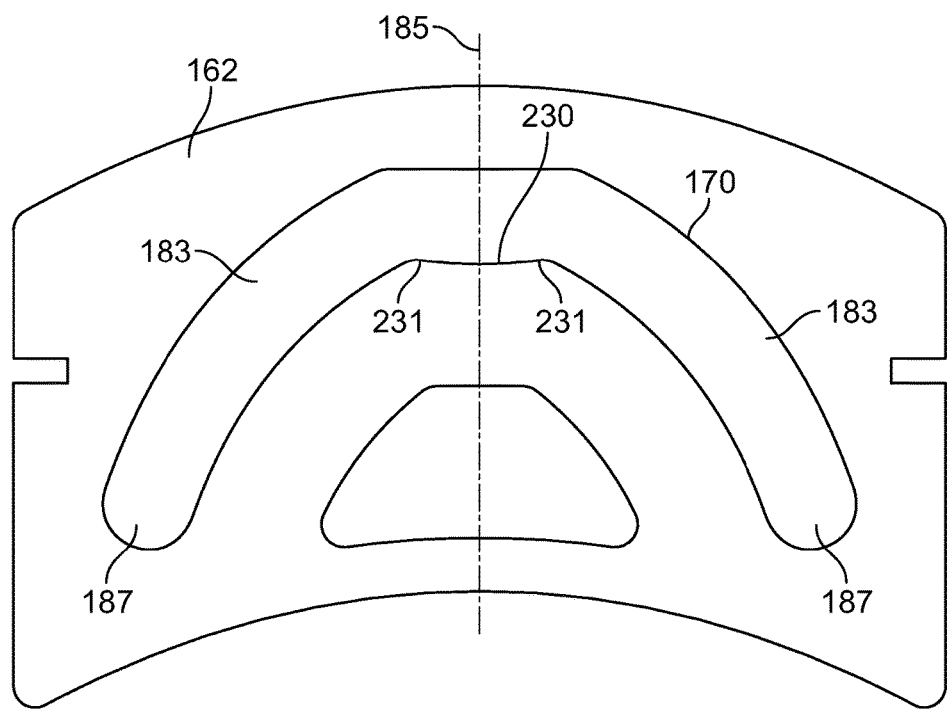
FIG. 9 is a top view of embodiments of a cam plate.
Figure 10:
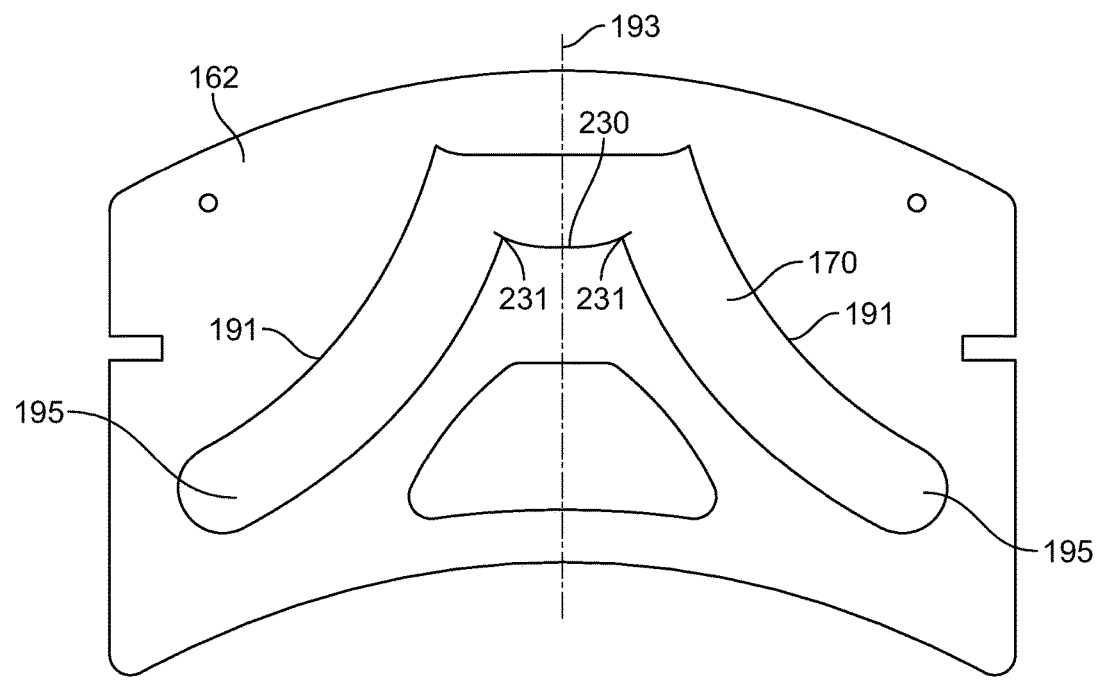
FIG. 10 is a top view of embodiments of a cam plate.

As shown in FIGS. 8, 9 and 10, the cam path 170 may be generally non-linear. The cam path 170 being non-linear may permit the fifth wheel head 136 to move rearward further within the same angular turn between the towed and towing vehicle 108 during operation of the automatic rolling fifth wheel hitch 100. By way of a non-limiting example, the non-linear cam path 170 may be formed from a plurality of linear paths integrated together to form the non-linear cam path 170. The non-linear cam path 170 may also be formed as an arcuate or semi-circular path.

As shown in FIG. 8, the cam path 170 may include two first paths or portions 175 that both extend in a generally angular direction from a center section 177. First portions may be generally symmetrical about centerline 181. The cam path 170 may also include second paths or portions 179 that may extend in a generally angular direction from ends of each first paths 175. These second portions 179 may extend at a different angle than the first portions 175 relative to centerline 181. By way of a non-limiting example, the first portions 175 may extend at a greater angle from a centerline 181 of the cam plate 162 than the second portions 179. In some embodiments, the second portions 179 may also be generally symmetrical one another, but the present teachings are not limited to such. In operation, the second portions 179 may provide a different rate of movement of trolley 132 as the towing vehicle 108 pivots relative to the towed vehicle as explained in more detail below. First and second portions 175, 179 may each be generally linear portions (i.e., each may extend in a generally continuous angular direction relative to centerline 181).

As shown in FIG. 9, the cam path 170 may include two generally arcuate portions 183. The arcuate portions 183 may extend at any appropriate relative angle from the centerline 185. By way of a non-limiting example, the arcuate portions 183 may be in a generally concave shape as shown in FIG. 9. The arcuate portions 183 may be symmetrical relative to one another. As the cam path 170 extends at an arcuately downward angle, end portions 187 of the cam path are at a different relative angle to the centerline 185 than top portions thereof. The curvature of arcuate portions 183 may provide a different rate of movement of trolley 132 as the towing vehicle 108 pivots relative to the towed vehicle as explained in more detail below.

As shown in FIG. 10, cam path 170 may include two generally arcuate portions 191. The arcuate portions 191 may extend at any appropriate relative angle from the centerline 193. By way of a non-limiting example, the arcuate portions 191 may be in a generally convex shape. The arcuate portions 191 may be symmetrical relative to one another. As the cam path 170 extends at an arcuately downward angle, end portions 195 of the cam path are at a different relative angle to the centerline 193 than top portions thereof. The curvature of arcuate portions 183 may provide a different rate of movement of trolley 132 as the towing vehicle 108 pivots relative to the towed vehicle as explained in more detail below.

Figure 4:
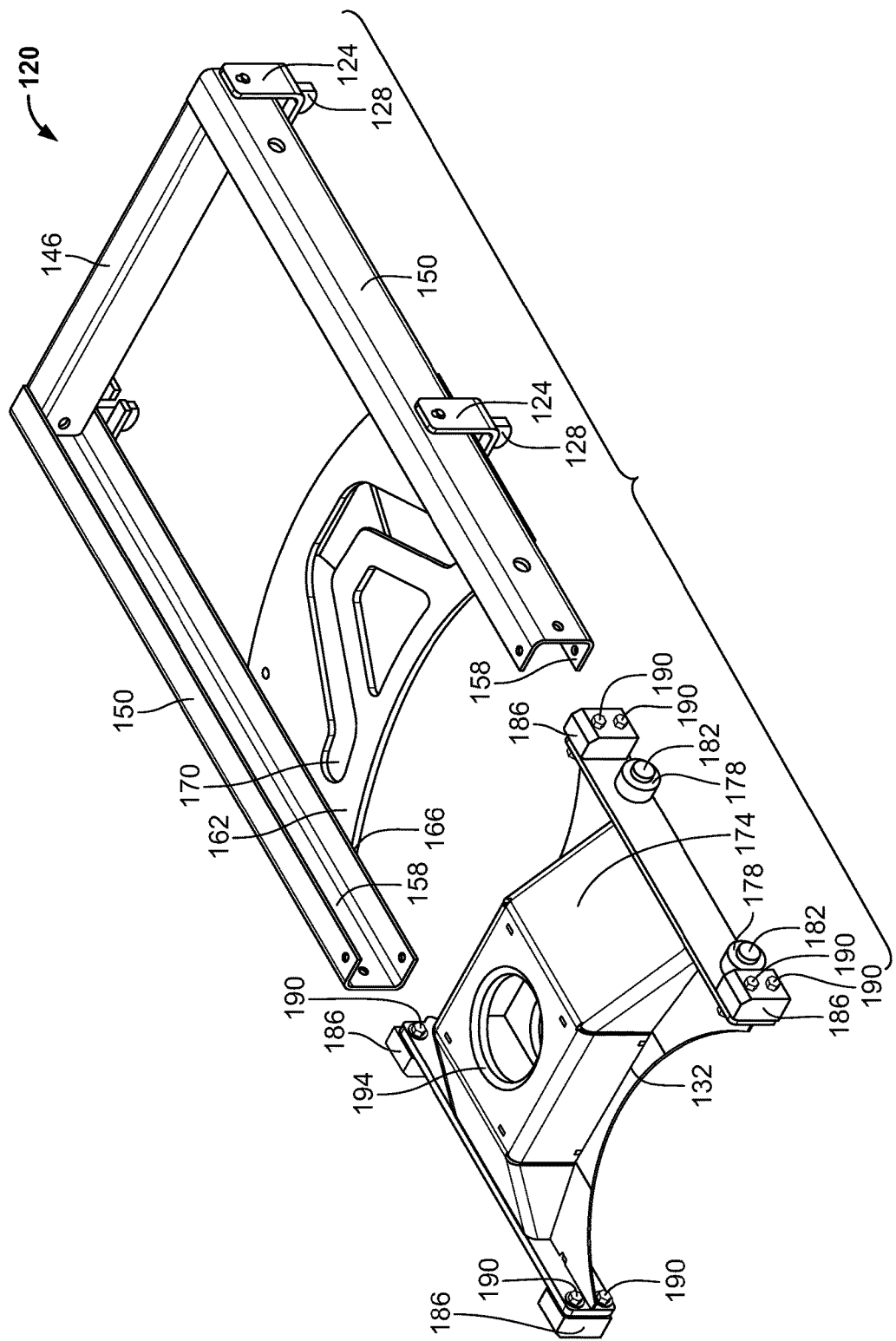
FIG. 4 is a partially exploded view of a base frame and trolley of the automatic rolling fifth wheel hitch.
Figure 5:
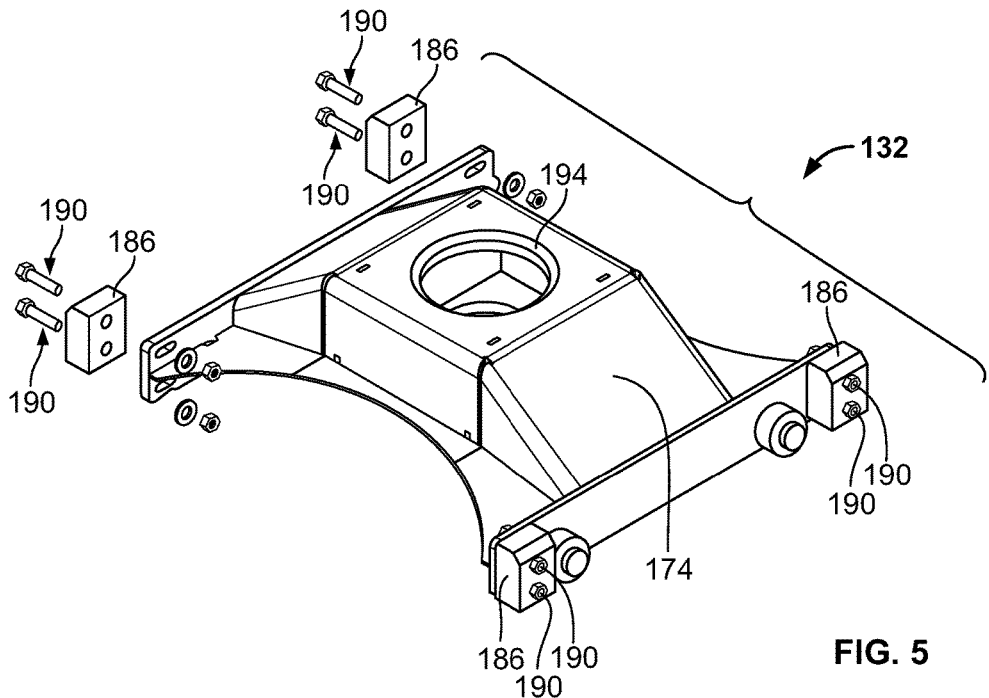
FIG. 5 is a perspective view of a trolley of the automatic rolling fifth wheel hitch.

The trolley 132 may be shaped and sized to generally extend between the longitudinally extending rails 150 and may include a portion of which that extends within the channel 158. More specifically, the trolley 132 may include a body 174 that may be shaped and sized to extend between the longitudinally extending rails 150 of the base frame 120. The trolley 132 may include a plurality of rollers or wheels 178 rotatably attached to the body 174 in any appropriate manner. By way of a non-limiting example, four rollers 178 may be used—although any appropriate number of rollers may be used without departing from the present teachings. As shown in FIG. 4, fasteners 182 may be used to attach the rollers 178 with the body 174. The present teachings, however, are not limited to use of fasteners 182. The rollers 178 may be attached with the body 174 in any appropriate manner.

The rollers 178 may be shaped and sized to operatively roll along the longitudinally extending rails 150, or more specifically along the channels 158 of the longitudinally extending rails 150. The rollers 178 may be formed from a generally rigid material that has an effective coefficient of friction such that the rollers 178 may roll along the channel 158 generally freely. Further, the rollers 178 may be of a material that generally prevents inappropriate wear during use of the automatic rolling fifth wheel hitch 100 and is able to carry the load of the automatic rolling fifth wheel hitch 100 during operation. By way of a non-limiting example, the rollers 178 may be formed from steel, or other metal, polymer, or other plastics, or a hard rubber, or a combination of such materials.

The trolley 132 may also include guide blocks 182. The guide blocks 182 may be attached to the body 174 in any appropriate manner, including, without limitation through use of fasteners 190. By way of a non-limiting example, four such guide blocks 182 may be attached with the body 174. The guide blocks 182 may be attached with the body 174 such that they are generally adjacent the rollers 178, or more specifically extend laterally away from the rollers 178 resulting in the guide blocks 182 being positioned on or near the corners of the trolley 132. The guide blocks 182 may keep a generally tight, operative fit between the trolley 132, or more specifically, the rollers 178 and the channel 158. The guide blocks 182 may control the axially upward and downward movement as well as the fore and aft movement of the trolley 132. The guide blocks 182 may also help control and guide the trolley 132 during operation of the automatic rolling fifth wheel hitch 100. The guide blocks 182 may be formed of any appropriate material, including, without limitation, polymer or other plastics, rubber, or a combination of such materials.

Further, as shown in FIGS. 3, 4, 6 and 7, the channel 158 may be generally enclosed on at least three sides with portions thereof extending downward and upward on a fourth side. This may form a generally C-shaped cross-sectional shape. This shape of the channel 158 may enclose the rollers 178 therein when operatively engaged. This enclosure may permit the automatic fifth wheel hitch 100, or more specifically, the base frame 120 to be positioned generally lower in the load bed 104 of the towing vehicle 108. Prior art systems are typically positioned higher in the load bed. The base frame 120 being lower in the load bed 108 may result in a generally lower center of gravity for the automatic fifth wheel hitch 100. Further, the base frame 120 may be wider than other prior art systems. The wider and lower base frame 120 may allow for a tighter (i.e., more controlled movement) automatic fifth wheel hitch 100. The automatic fifth wheel hitch 100 may provide additional control for an operator and is more efficient than other prior art systems. Further, the automatic fifth wheel hitch 100 may provide a more direct load path, e.g., from top of the fifth wheel head 136 to the rollers 178. The wider and lower base frame 120 may spread the load applied to the fifth wheel head 136 during operation down to the trolley 132 and through to the legs 128 and ultimately to the towing vehicle 108. This may result in a more efficient and effective automatic fifth wheel hitch 100. The operation of which may be smoother and more stable than other prior art systems.

As shown in FIG. 4, once the trolley 132 has been assembled, it may be operatively engaged with the base frame 120. Either one of the end rails 146 may be removed from the base frame 120 or not otherwise attached thereto. This may provide access between the trolley 132 and the channel 158, or more specifically, the channel 158 and the rollers 178 of the trolley 132. The trolley 132 may be rolled onto the base frame 120 such that the rollers 178 may freely roll within the channel 158. This may result in the trolley 132 being capable of rolling freely within the base frame 120 generally between the end rails 146 during operation of the automatic rolling fifth wheel hitch 100 as described in more detail below.

The body 174 of the trolley 132 may include an aperture 194. The aperture 194 may be shaped and sized such that the pivot shaft 140 may be inserted within the body 174. The pivot shaft 140 may be inserted into the aperture 194 so that it is pivotally attached with the body 174. In such embodiments, a protective ring 198 may be generally aligned with the aperture 194 and as the pivot shaft 140 is inserted into the aperture 194, the protective ring 198 may be positioned between the pivot shaft 140 and the body 174. The protective ring 198 may be made of any appropriate material, including, without limitation a sacrificial material. Further, by way of non-limiting examples, the material may include elastomer, plastic, rubber, or any combination of such. The protective ring 198 being positioned between the body 174 and pivot shaft 140 may generally protect either or both of the pivot shaft 140 and body 174 during operation of the automatic rolling fifth wheel hitch 100. Additionally, the protective ring 198 may act as a lubricant or friction reduction surface during operation of the automatic rolling fifth wheel hitch 100.

Figure 7:
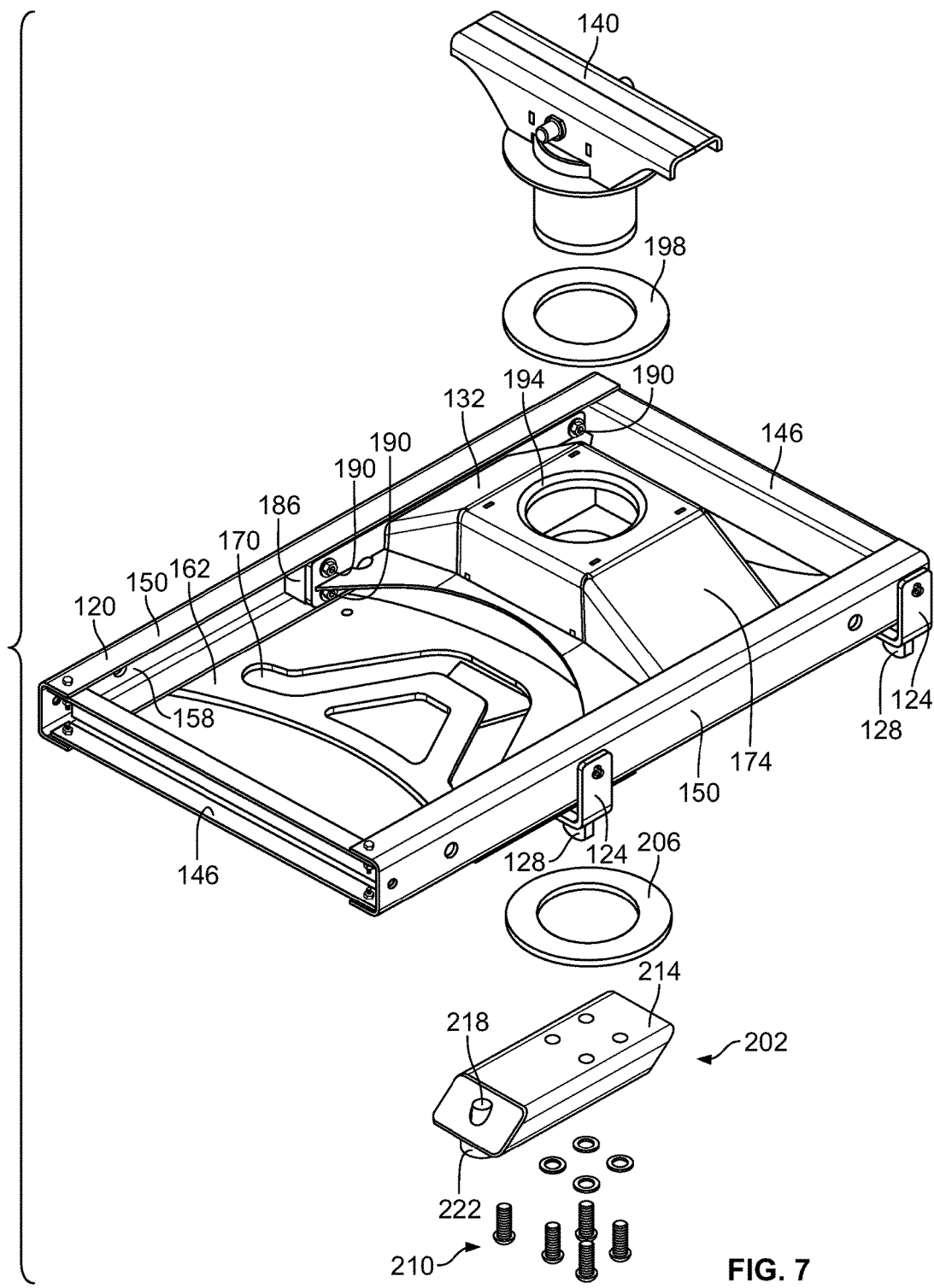
FIG. 7 is a partially exploded view of a portion of the automatic rolling fifth wheel hitch.

As shown in FIG. 7, a cam follower 202 may be operatively attached with the trolley 132. In such embodiments, a cam follower protective ring 206 may be generally positioned between the cam follower 202 and the body 174 of the trolley 132. The protective ring 206 may be made of any appropriate material, including, without limitation a sacrificial material. Further, by way of non-limiting examples, the material may include elastomer, plastic, rubber, or any combination of such. The protective ring 206 may generally protect either or both of the cam follower 202 and body 174 during operation of the automatic rolling fifth wheel hitch 100 (i.e., the rotating of cam follower 202 relative to body 174). Additionally, the protective ring 206 may act as a lubricant or friction reduction surface during operation of the automatic rolling fifth wheel hitch 100. The cam follower 202 may be attached with the trolley 132 in any appropriate manner. By way of a non-limiting example, the cam follower 202 may attach with the trolley 132 by a plurality of fasteners 210. Specifically, the fasteners 210 may operatively secure the cam follower 206 with the pivot shaft 140. The fasteners 210 may be inserted into and connected with the trolley 132.

The cam follower 202 may include a body portion 214 and a cam portion 218. The body portion 214 may be attached with the pivot shaft 140 when it is inserted into and connected with the body 174 of the trolley 132. Therefore, as the pivot shaft 140 pivots, the cam follower 202 or more specifically, the body portion 214 may pivot. The cam portion 218 may include a contact member 222 that may be shaped and sized to operatively fit within and engage the cam path 170. The contact member 222 may follow the cam path 170 during operation of the automatic fifth wheel hitch 100 and may be generally retained within the cam path 170. In this manner, cam follower 202 is engaged with and follows cam path 170 during operation of automatic fifth wheel hitch 100.

In some embodiments, the automatic rolling fifth wheel hitch 100 may include a cover 226 attached with the base frame 120. The cover 226 may generally encapsulates the base frame 120, trolley 132 and the cam plate 162. More specifically, the cover 226 may generally encapsulate or circumscribe the working components of the automatic rolling fifth wheel hitch 100. The cover 226 may provide an aesthetically pleasing finish for the automatic rolling fifth wheel hitch 100. The cover 226 may also generally protect the working components of the automatic rolling fifth wheel hitch 100 from the elements, which may extend the life thereof and may generally protect operative engagement between the rollers 178 and the channel 158.

In operation, the automatic fifth wheel hitch 100 may be attached to the load bed 104 of the towing vehicle 108 as described above. A king pin (not shown) of a towed vehicle (not shown) may be operatively secured with the fifth wheel head 136 in any appropriate manner. Once operatively attached, the towing vehicle 108 may be operated. At this point any relative rotation between the towed vehicle and the fifth wheel head 136 may be inhibited by a detent section in the cam path as described below. The towed vehicle may then be towed in the normal manner by the towing vehicle 108. When the towing vehicle 108 and the towed vehicle encounter a turn in the road, the towed vehicle may pivot relative the towing vehicle 108. More specifically, under such conditions the towed vehicle may pivot relative to the trolley 134 about a vertical axis A that generally coincides with the fifth wheel head 136 and as shown in FIG. 1.

When the towed vehicle pivots relative to the towing vehicle 108, the fifth wheel head 136, pivot shaft 140 and cam follower 202 may pivot relative to the towing vehicle 108. The fifth wheel head 136, pivot shaft 140 and cam follower 202 may all be fixedly secured with one another such that they may pivot in unison. The trolley 132, however, will not pivot with respect to the load bed 104 of the towing vehicle 108. The cam path 170 may include a detent section 230, such as that shown in FIGS. 8, 9 and 10 generally in proximity to the fore and aft centerline 181, 185 and 193, respectively of the cam plate 162. The detent 230 may form a normal operating position for the cam follower 202. When the towing vehicle 108 is in a normal driving operation, e.g., when driving generally straight and aligned with the towed vehicle, the cam follower 202 or more specifically the contact member 222 may be engaged in the detent 230, i.e., it may generally be positioned in the detent 230. The detent 230 may be curved. Detent 230 may have end portions 231 that generally maintain cam follower 202 engaged in detent 230 during normal driving operation and inhibit the contact member 222 and cam follower 202 from moving along the cam path 170 outside of detent 230. However, when the fifth wheel head 136, pivot shaft 140 and cam follower 202 may be caused to pivot, such as by the turning of towing vehicle 108 a sufficient amount relative to the towed vehicle, the cam follower 202 may move out from the detent 230 past end portions 231 and travel further along cam path 170. The distance cam follower 202 moves along cam path 170 may be related to the degree of relative pivoting between the towing vehicle 108 and the towed vehicle (i.e., the degree of relative rotation between the fifth wheel head 136 and body 174).

The cam follower 202 being released from the detent 230 may generally allow the trolley 132 to roll towards a rear portion 234 of the towing vehicle 108 as the pivot angle between the towing vehicle and the towed vehicle changes. The momentum of the trolley 132 resulting from turning of the towing vehicle 108 may allow the rollers 178 to roll along the channel 158. This momentum may continue to roll the trolley toward the rear portion 234 of the towing vehicle 108 until at least one of the guide blocks 182 engages with the end rail 146 closest to the rear portion 234 of the towing vehicle 108. As the trolley 132 rolls toward the rear portion 234 of the towing vehicle 108, the cam follower 202 may continue to move along the cam path 170 toward the rear portion 234 of the towing vehicle 108. This may result in the fifth wheel head 136 traveling in conjunction with the trolley 132 rearward toward the rear portion 234 of the towing vehicle 108. This rearward movement of the fifth wheel head 136 may generally create additional space between a cab 238 of the towing vehicle 108 and the towed vehicle. This additional space may thereby provide sufficient room for the towed vehicle to pivot with respect to the towing vehicle 108 without interference.

Figure 11:
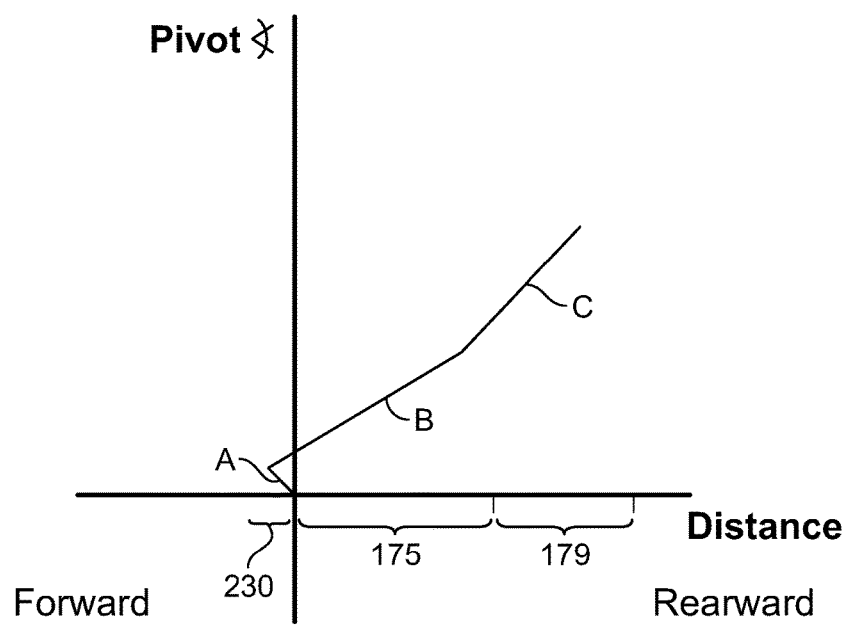
FIG. 11 is a graphical representation of change of angle versus travel distance for a cam path of the cam plate of FIG. 8.

For the cam plate 162 of FIG. 8, once the cam follower 202 releases from the detent 230, the cam follower 202 will follow along either of the generally symmetrical first portions 175. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The different configurations of the first and second portions 175, 179 may result in the trolley 132 moving at a different rate and/or distance in response to relative rotation between the towing vehicle 108 and the towed vehicle. That is, when the cam follower 202 moves from first portion 175 into second portion 179 (and vice versa), the relation between the rate of movement and/or the distance moved of trolley 132 with respect to the change of the pivot angle between the towed vehicle and towing vehicle 108 changes. In the configuration shown in FIG. 8, the rate of movement and the distance moved by trolley 132 as a function of the change in the pivot angle is less in second portion 179 than in first portion 175. This configuration of the cam path 170 may allow the towed vehicle to move away from the cab 238 at a greater rate, resulting in a greater distance between the cab 238 and the towed vehicle during the initial phase of relative rotation between the towing vehicle 108 and the towed vehicle. Depending on the shape of detent section 230 and end portions 231, the towed vehicle may experience an initial forward movement relative to the towing vehicle 108 as cam follower 202 moves out of the detent section 230. The movement of the trolley 132 as a function of the change in the pivot angle is represented in the graph of FIG. 11. As shown, the trolley may undergo a first motion A as cam follower 202 moves out of detent section 230, a second motion B as cam follower 202 moves along first portion 175, and a third motion C as cam follower 202 moves along second portion 179.

Figure 12:
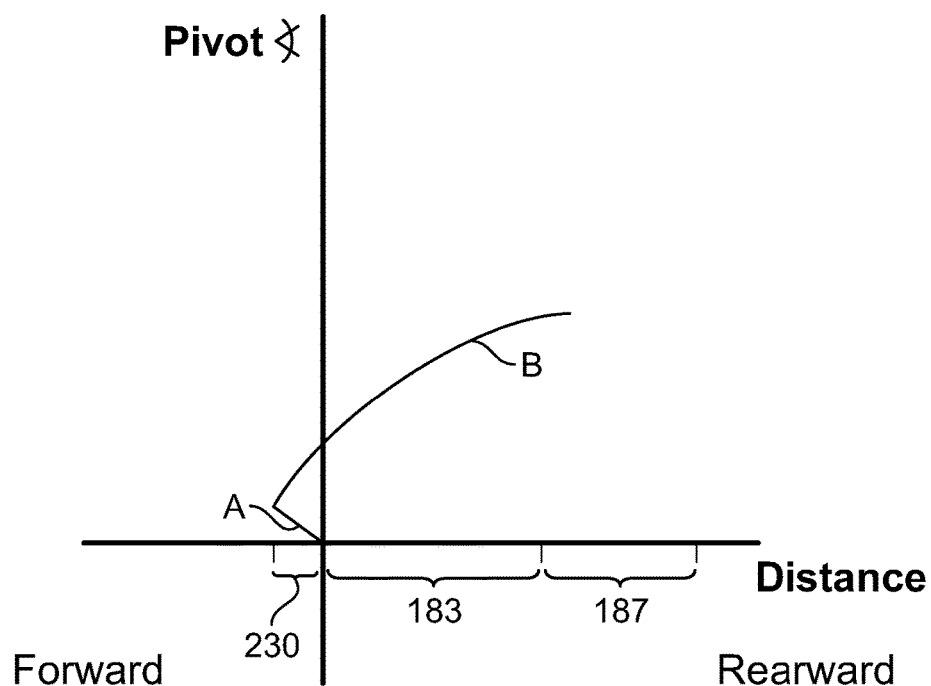
FIG. 12 is a graphical representation of change of angle versus travel distance for a cam path of the cam plate of FIG. 9.

For the cam plate 162 of FIG. 9, once the cam follower 202 releases from the detent 230, the cam follower 202 will follow along either of the generally arcuate portions 183. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The arcuate configuration of path 183 may result in a continuously varying rate of movement and distance traveled by trolley 132 as a function of the change in the pivot angle. The movement of the trolley 132 as a function of the change in the pivot angle as cam follower 202 moves along arcuate path 183 may be represented by the graph of FIG. 12. As shown, trolley 132 may undergo a first motion A as cam follower 202 moves out of detent section 230 and a second motion B as cam follower 202 moves along arcuate portion 183. As can be seen in second motion B, trolley 132 moves a shorter distance and at a slower rate as the pivot angle increases. That is, as the cam follower 202 moves along the arcuate path 183 toward the end portion 187, the relation between the distance traveled and the rate of travel in response to a change of the pivot angle changes.

Figure 13:
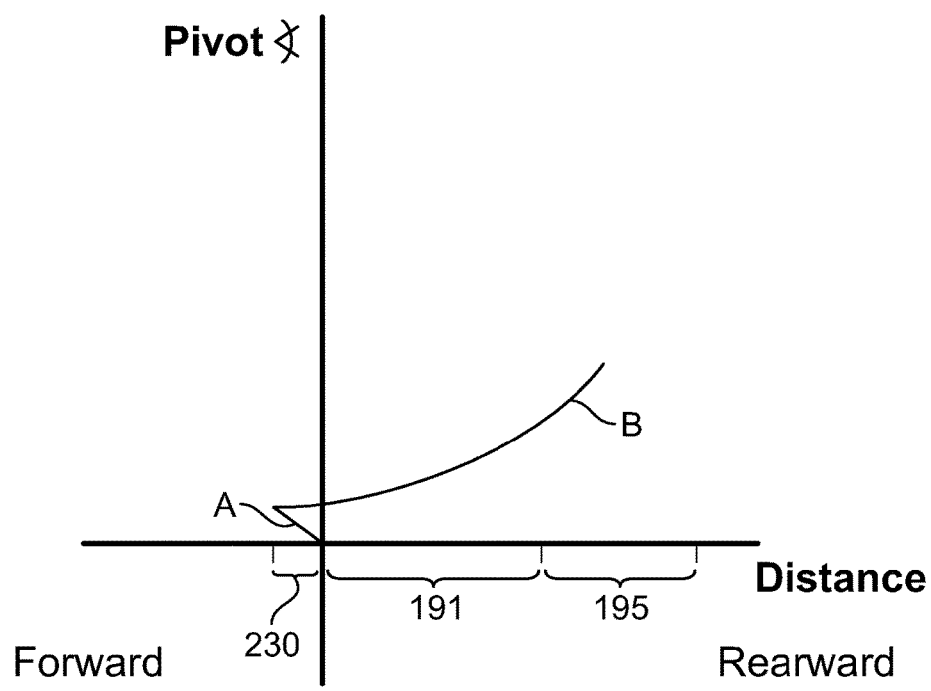
FIG. 13 is a graphical representation of change of angle versus travel distance for a cam path of the cam plate of FIG. 10.

For the cam plate 162 of FIG. 10, once the cam follower 202 releases from the detent 230, the cam follower 202 will follow along either of the generally arcuate portions 191. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The arcuate configuration of path 191 may result in a continuously varying rate of movement and distance traveled by trolley 132 as a function of the change in the pivot angle. The movement of the trolley 132 as a function of the change in the pivot angle as cam follower 202 moves along arcuate path 191 may be represented by the graph of FIG. 13. As shown, trolley 132 may undergo a first motion A as cam follower 202 moves out of detent section 230 and a second motion B as cam follower 202 moves along arcuate portion 191. As can be seen in second motion B, trolley 132 moves a greater distance and at a greater rate as the pivot angle increases. That is, as the cam follower 202 moves along the arcuate path 191 toward the end portion 1195, the relation between the distance traveled and the rate of travel in response to a change of the pivot angle changes.

As the towing vehicle 108 straightens out and returns from a turning position to a straight ahead position (aligned with the towed vehicle) the change in the pivot angle will move cam follower 202 forward along the cam path 170 toward detent 230. The fifth wheel head 136, pivot shaft 140 and cam follower 202 will all pivot back towards a straightened position and trolley 132 will move forward. Once the towing vehicle 108 straightens out a sufficient distance, the cam follower 202 may engage the detent 230 of the cam plate 162.

Additional embodiments of an automatic rolling fifth wheel hitch according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired automatic rolling fifth wheel hitch without departing from the spirit and scope of the present teachings.

Figure 14:
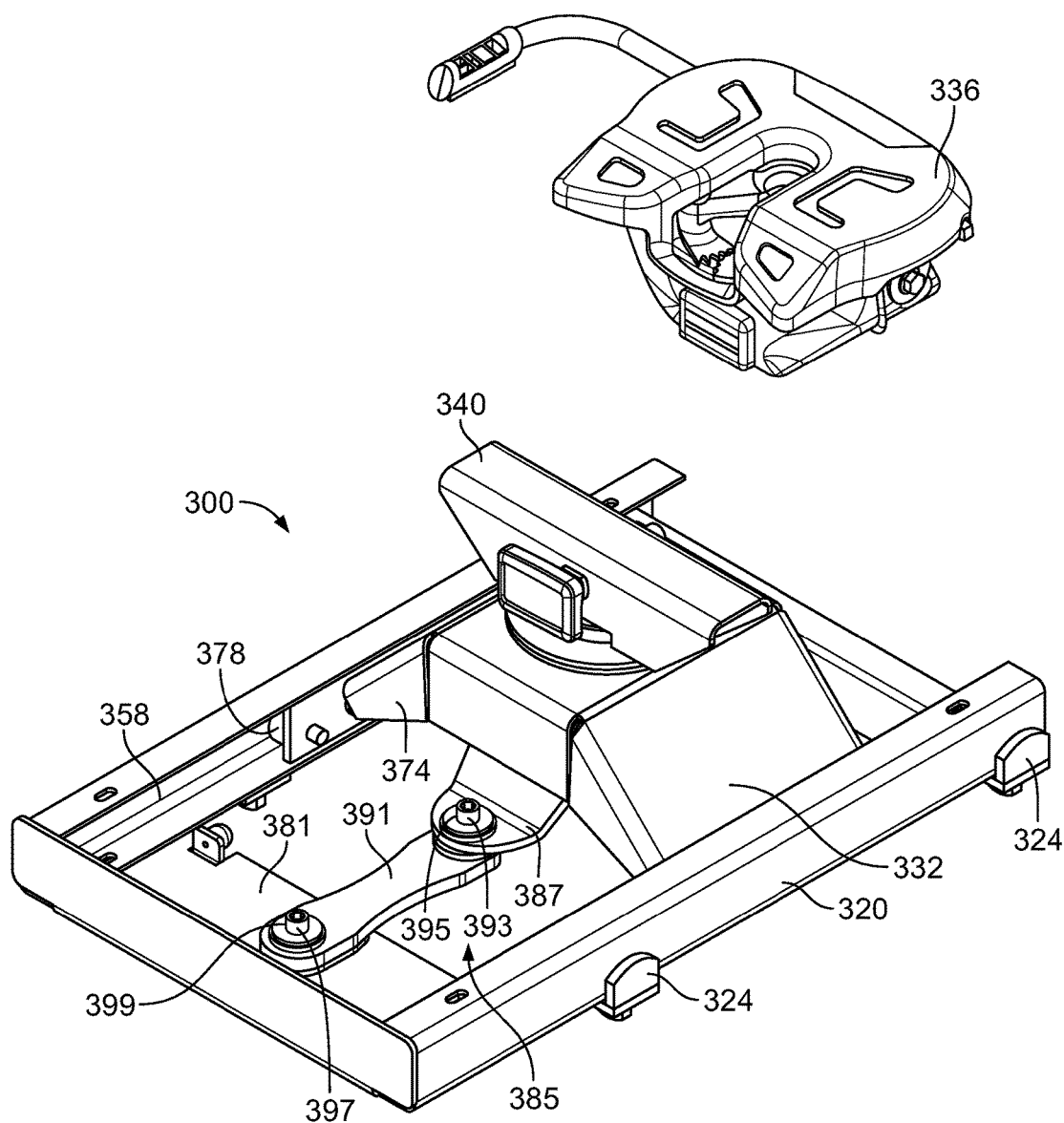
FIG. 14 is a perspective view of embodiments of an automatic rolling fifth wheel hitch.
Figure 15:
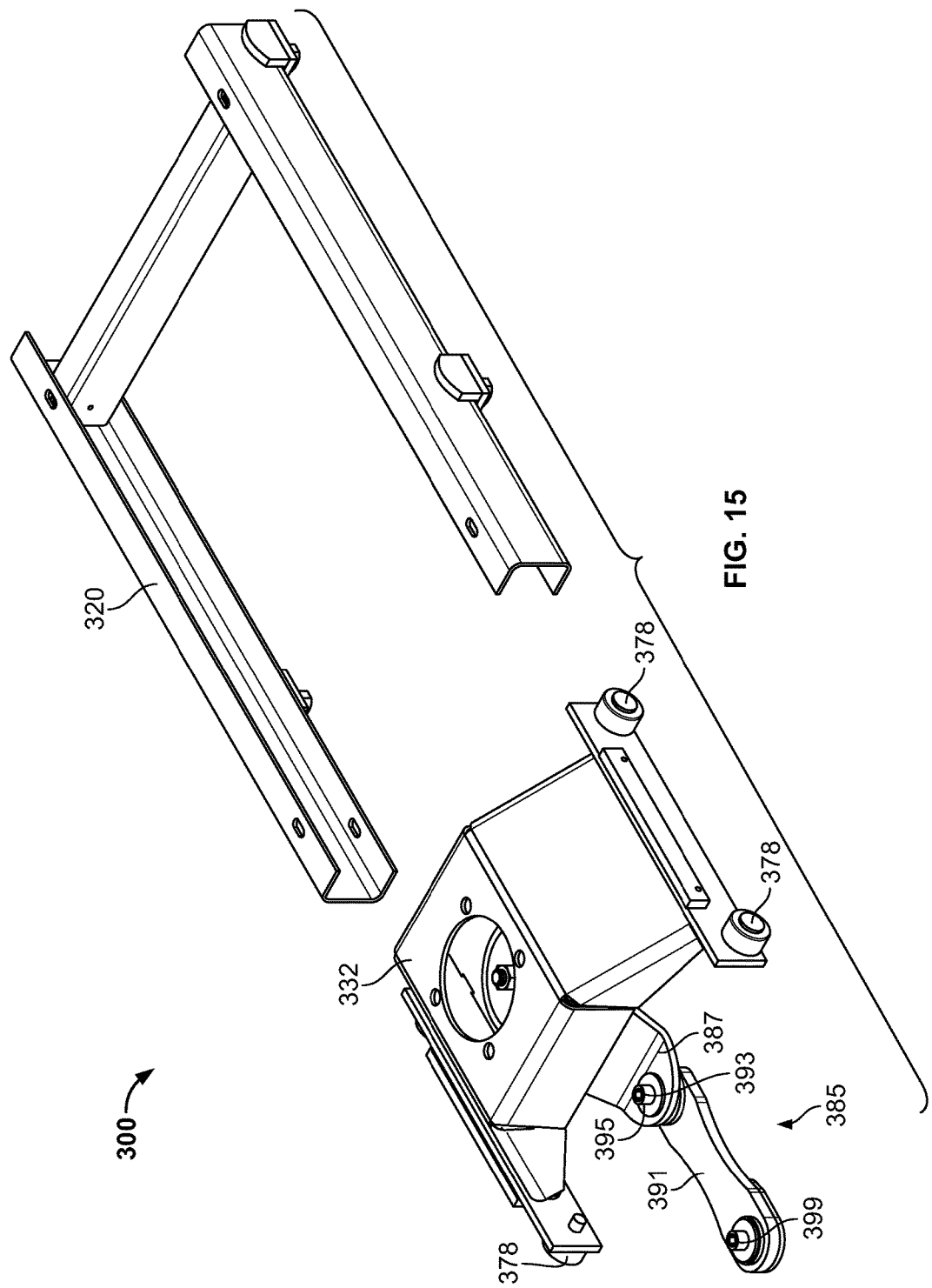
FIG. 15 is a partially exploded view of a base frame and trolley of the automatic rolling fifth wheel hitch.
Figure 16:
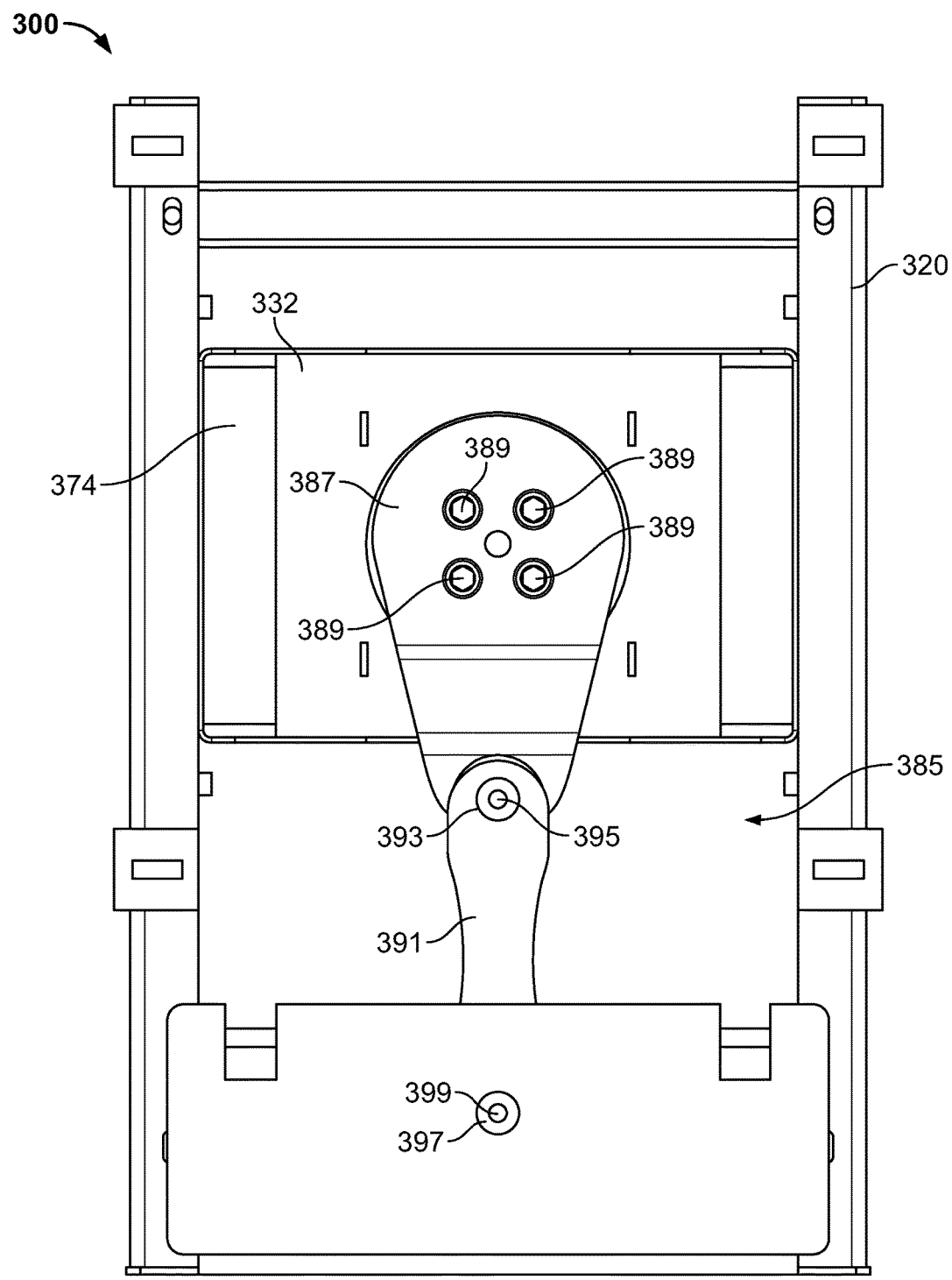
FIG. 16 is a bottom view of the automatic rolling fifth wheel hitch of FIG. 14.

An automatic rolling fifth wheel hitch 300 is shown in FIGS. 14-16. The automatic rolling fifth wheel hitch 300 may attach to a load bed 104 of a towing vehicle 108 in any appropriate manner. The automatic rolling fifth wheel hitch 300 may include a base frame 320 selectively secured to the rail members 112. The base frame 320 may include at least one bracket 324, including, without limitation two pairs of brackets 324 attached thereto. The brackets 324 may attach with the rail members 112 through the use of fasteners (not shown).

The automatic rolling fifth wheel hitch 300 may include a trolley 332 operatively engaged with the base frame 320 as described in more detail below. The automatic rolling fifth wheel hitch 300 may further include a fifth wheel head 336 pivotally attached with the trolley 332. The fifth wheel head 336 may be of any appropriate configuration such that a king pin of a towed vehicle may operatively engage with the fifth wheel head 336 resulting in the towing vehicle 108 being capable of towing the towed vehicle.

The fifth wheel head 336 may be pivotally attached with the trolley 332 through use of a pivot shaft 340. The fifth wheel head 336 may be attached with the pivot shaft 340 in any appropriate manner. By way of a non-limiting example, the fifth wheel head 336 may be attached with the pivot shaft 340 through the use of fasteners, welding, or the like. The fifth wheel head 336 attached with the pivot shaft 340 may result in the fifth wheel head 336 being pivotable with respect to the base frame 320. The pivoting of the fifth wheel head 336 may allow the towed vehicle to pivot with respect to the towing vehicle 108 during operation. Therefore, as the towing vehicle 108 turns, the fifth wheel head 336 may pivot independently of the towing vehicle 108. This may permit the towed vehicle to turn more efficiently and effectively.

The trolley 332 may be shaped and sized to generally extend with the base frame 320 and may include a portion of which that extends within a channel 358 of the base frame 320. More specifically, the trolley 332 may include a body 374 that may be shaped and sized to extend between the base frame 320. The trolley 332 may include a plurality of rollers or wheels 378 rotatably attached to the body 374 in any appropriate manner. By way of a non-limiting example, four rollers 378 may be used—although any appropriate number of rollers may be used without departing from the present teachings.

The rollers 378 may be shaped and sized to operatively roll along the channels 358 of the base frame 320. The rollers 378 may be formed from a generally rigid material that has an effective coefficient of friction such that the rollers 378 may roll along the channel 358 generally freely. Further, the rollers 378 may be of a material that generally prevents inappropriate wear during use of the automatic rolling fifth wheel hitch 300 and is able to carry the load of the automatic rolling fifth wheel hitch 300 during operation.

The automatic rolling firth wheel hitch 300 may include a plate member 381 attached with the base frame 320 in any appropriate manner, including, without limitation through welding, fastening or the like. Further, a linkage 385 may be operatively secured with the fifth wheel head 336 through the pivot shaft 340 and the plate member 381. As shown in FIGS. 14-15, the linkage 385 may include a first arm 387 fixedly attached with the pivot shaft 340 and fifth wheel head 336. By way of a non-limiting example, the first arm 387 may be fixedly attached with the pivot shaft 340 such as through the use of a plurality of fasteners 389. The first arm 387, however, may be fixedly attached with the pivot shaft 340 and fifth wheel head 336 in any appropriate manner and is not limited to the fasteners 389 shown. First arm 387 may act as a bell crank.

The linkage 385 may further include a second arm 391. The second arm 391 may be pivotally attached between the first arm 387 and the plate member 381. By way of a non-limiting example, the second arm 391 may be pivotally attached with the first arm 387 at pivot 393, such as through use of a fastener 395. Any appropriate fastener 395 may be used without departing from the present teachings. The second arm 391 may also be pivotally attached with the plate member 381 at a second pivot 397, such as through use of a fastener 399. Any appropriate fastener 397 may be used without departing from the present teachings. In some embodiments, the fastener 395 may be substantially similar to the fastener 399 or they may be different.

In operation, when the towing and towed vehicles are generally aligned, the first and second arms 389, 391 of the linkage 385 may remain generally aligned. As the towing vehicle pivots with respect to the towed vehicle, the fifth wheel head 336 may pivot, which may pivot the pivot shaft 340 and the first arm 387. As the first arm 387 pivots, this may cause the first arm 387 and second arm to pivot at pivot point 393. The pivoting of the linkage 385, or more specifically, the first arm 387 relative to the second arm 391, may cause the trolley 332 to be displaced rearward toward the rear of the towing vehicle, i.e., the momentum causes the rearward movement of the trolley 332. Further, the second arm 391 may pivot with respect to the plate member 381 at pivot 397. This motion of the trolley 332 may move the attachment point of the towed vehicle with the towing vehicle rearward. This may create a greater clearance between the towed vehicle and towing vehicle. Specifically, it may create more space between the cab of the towing vehicle and the towed vehicle.

Once the towing and towed vehicles have completed the turn and begin to straighten, the momentum of such may force the trolley 332 forward. This may cause the linkage 385 to straighten, i.e., the first arm 387 and second arm pivot 391 until they are generally aligned. This may move the towed vehicle in closer proximity to the towing vehicle's cab returning the automatic rolling fifth wheel hitch 300 to its normal operating position.

It should be appreciated that the various cam paths shown and described are exemplary cam paths and that variations can be made. By way of non-limiting example, the cam paths can take other shapes and configurations and may include or exclude the detent.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A fifth wheel hitch comprising:
   a base frame configured to be secured to a load bed of a towing vehicle, the base frame including fore and aft extending rails;
   a trolley operatively engaged with the base frame, the trolley adapted to move along the rails between first and second positions, wherein load applied by the trolley in moving along the rails between the first and second positions is imparted along the rails;
a cam member attached with the base frame, the cam member having a cam path positioned entirely between the fore and aft extending rails;
a cam follower coupled with the trolley, the cam follower operatively engaged with the cam path; and
a fifth wheel head pivotally coupled with the trolley, wherein the trolley is moved between the first and second positions in response to pivoting of the fifth wheel head.

2. The fifth wheel hitch of claim 1, wherein the base frame includes a channel whereby the trolley is operatively engaged with the base frame.

3. The fifth wheel hitch of claim 2, wherein the trolley includes a plurality of rollers, the rollers engaged with the channel and the trolley rolls along the base frame between the first and second positions.

4. The fifth wheel hitch of claim 2, further comprising a plurality of guide plates, wherein the guide plates are engaged with the channel.

5. The fifth wheel hitch of claim 1, wherein the cam path includes a detent, the cam follower engaging the detent when in the first position and whereby pivoting of the fifth wheel head moves the cam follower from the detent and permits the trolley to move along the base frame to the second position.

6. The fifth wheel hitch of claim 1, wherein the cam path is non-linear, whereby the cam follower operatively engages the non-linear cam path during rolling movement of the trolley.

7. The fifth wheel hitch of claim 1, wherein the cam path includes a first portion causing the trolley to move between the first and second positions at a first rate as the fifth wheel head pivots.

8. The fifth wheel hitch of claim 7, wherein the cam path includes a second portion causing the trolley to move between the first and second positions at a second rate as the fifth wheel head pivots whereby the second rate is different from the first rate.

9. The fifth wheel hitch of claim 8, wherein the second portion is at a different pivot angle of the head relative to a centerline of the cam member than the first portion.

10. The fifth wheel hitch of claim 8, wherein the second rate is less than the first rate.

11. The fifth wheel hitch of claim 10, wherein the second portion is closer to the second position than the first portion.

12. The fifth wheel hitch of claim 1, further comprising a plurality of guide blocks positioned on the trolley.

13. The fifth wheel hitch of claim 12, wherein the guide blocks engage the base frame generally preventing vertical movement of the trolley with respect to the base frame.

14. The fifth wheel hitch of claim 12, wherein the guide blocks limit fore and aft movement of the trolley with respect to the towing vehicle.

15. A fifth wheel hitch comprising:
a base frame securable to a load bed of a towing vehicle, the base frame including a channel;
a trolley having a plurality of rollers, the rollers operatively engaged with the channel, wherein the trolley is moveable between first and second positions with respect to the base frame;
a cam path, the cam path having a first portion; and
a cam follower coupled with the trolley, the cam follower operatively engaging the first portion of the cam path, wherein pivoting of the cam follower releases the cam follower from the first portion permitting movement of the trolley fore and aft between the first and second positions.

16. The fifth wheel hitch of claim 15, further comprising a cam plate, the cam plate attached with the base frame, whereby the cam path is formed in the cam plate.

17. The fifth wheel hitch of claim 15, wherein the first portion is an arcuate detent section in the cam path.

18. The fifth wheel hitch of claim 17, wherein the cam follower moving from the detent moves the trolley forward to the first position.

19. The fifth wheel hitch of claim 17, further comprising a fifth wheel head pivotally engaged with the trolley, wherein pivoting of the fifth wheel head moves the cam follower out of the first portion of the cam path permitting the trolley to move to the second position.

20. The fifth wheel hitch of claim 19, wherein the trolley is moveable fore and aft relative to the towing vehicle.

21. A fifth wheel hitch comprising:
a base frame securable to a load bed of a towing vehicle, the base frame including a channel;
a trolley operatively engaged with the channel, wherein the trolley is positionable between first and second positions with respect to the base frame;
a plurality of guide blocks positioned on the trolley, wherein the guide blocks engage the base frame generally preventing vertical movement of the trolley with respect to the base frame;
a fifth wheel head pivotally coupled to the trolley;
a cam path, the cam path having a first portion; and
a cam follower coupled with the trolley and engaged with the cam path, wherein pivoting of the fifth wheel head moves the cam follower from the first portion causing the trolley to move between the first and second positions.

22. The fifth wheel hitch of claim 21, further comprising a plurality of rollers attached with the trolley and rollably engaged with the base frame, wherein the trolley is rollable between the first and second positions.

23. The fifth wheel hitch of claim 21, wherein the guide blocks limit fore and aft movement of the trolley with respect to the towing vehicle.

24. The fifth wheel hitch of claim 21, wherein the first portion is a detent portion and the cam path includes a second portion, the trolley being in a forwardmost position when the cam follower is engaged with the detent portion and moving toward a rearmost position as the cam follower travels along the second portion away from the first portion.

25. The fifth wheel hitch of claim 24, wherein the second portion is an arcuate portion.

26. The fifth wheel hitch of claim 24, wherein a rate of travel of the trolley as a function of the pivoting of the fifth wheel head increases as the trolley approaches the rearmost position.

27. The fifth wheel hitch of claim 24, wherein a rate of travel of the trolley as a function of the pivoting of the fifth wheel head decreases as the trolley approaches the rearmost position.

28. The fifth wheel hitch of claim 24, wherein a rate of travel of the trolley as a function of the pivoting of the fifth wheel head is constant as the cam follower travels along the second portion.

29. The fifth wheel hitch of claim 28, wherein the cam path includes a third portion, the trolley being in the rearmost position when the cam follower is engaged with the third portion, and the rate of travel of the trolley as a function of the pivoting of the fifth wheel head is constant as the trolley cam follower travels along the third portion.

30. The fifth wheel hitch of claim 29, wherein the rate of travel of the trolley as a function of the pivoting of the fifth wheel head is different in the second portion then in the third portion.

31. A fifth wheel hitch comprising:
a base frame securable to a load bed of a towing vehicle, the base frame including a pair of spaced apart channels, at least one of the pair of channels having at least one laterally extending open side; and
a fifth wheel head operatively coupled with the based frame, wherein the fifth wheel head is positionable fore and aft between first and second positions along the channels and the laterally extending open side is directed toward the fifth wheel head, wherein the positioning of the fifth wheel head between the first and second positions is a function of rotation of the fifth wheel head relative to the base frame.

32. The fifth wheel hitch of claim 31, further comprising:
a trolley attached with the fifth wheel head and operatively engaged with the channels, wherein the trolley positions the fifth wheel head between the first and second positions;
a non-linear cam path included with the base frame, the cam path having a first portion; and
a cam follower secured with the trolley, the cam follower operatively engaging the first portion of the cam path, wherein pivoting of the cam follower moves the cam follower from the first portion to follow at least a portion of the non-linear cam path causing the trolley to move between the first and second positions.

33. The fifth wheel hitch of claim 32, further comprising a plurality of rollers attached with the trolley and rollably engaged with the channel, wherein the trolley is rollable between the first and second positions.

34. The fifth wheel hitch of claim 32, further comprising a plurality of guide blocks positioned on the trolley, wherein the guide blocks engage the channel generally preventing vertical movement of the trolley with respect to the base frame.

35. A fifth wheel hitch comprising:
a base frame securable to a load bed of a towing vehicle;
a trolley operatively engaged with and positionable between first and second positions with respect to the base frame;
a fifth wheel head pivotally coupled to the trolley;
a cam path, the cam path including first, second and third portions;
a cam follower coupled with the trolley and engaged with the cam path, wherein pivoting of the fifth wheel head moves the cam follower from the first portion causing the trolley to move between the first and second positions; and
wherein the cam follower moving along the second portion away from the first portion, a rate of travel of the trolley as a function of the pivoting of the fifth wheel head is constant and whereby the cam follower moving along the third portion the rate of travel of the trolley as a function of the pivoting of the fifth wheel head is constant.

36. A fifth wheel hitch comprising:
a base frame securable to a load bed of a towing vehicle;
a trolley operatively engaged with and positionable between first and second positions with respect to the base frame;
a fifth wheel head pivotally coupled to the trolley;
a cam path, the cam path including first, second and third portions;
a cam follower coupled with the trolley and engaged with the cam path; and
wherein the trolley is in a forwardmost position when the cam follower is engaged with the first portion whereby pivoting of the fifth wheel head moves the cam follower from the first portion, moves the trolley toward a rearmost position as the cam follower travels along the second portion away from the first portion and moves the trolley to the rearmost position as the cam follower travels along the third portion away from the second portion, whereby a rate of travel of the trolley changes as a function of the pivoting of the fifth wheel head as the trolley approaches the rearmost position.

37. A fifth wheel hitch comprising:
a base frame;
a trolley operatively engaged with the base frame;
a fifth wheel head pivotally coupled to the trolley;
a cam path, the cam path including first, second and third portions;
a cam follower coupled with the trolley and engaged with the cam path, wherein pivoting of the fifth wheel head moves the cam follower from the first portion causing the trolley to move forward at a first rate of travel; and
wherein the cam follower moving along the second portion away from the first portion causes the trolley to move backward at a second rate of travel and whereby the cam follower moving along the third portion causes the trolley to move backward at a third rate of travel.

38. The fifth wheel hitch of claim 37, wherein the first, second and third rates of travel are different from one another.

* * * * *